United States Patent
Van Pelt et al.

(10) Patent No.: US 6,911,144 B2
(45) Date of Patent: Jun. 28, 2005

(54) FILTER CARTRIDGE WITH STRAP AND METHOD

(75) Inventors: Randall David Van Pelt, Salisbury, MO (US); Charles Grant Carothers, Glasgow, MO (US)

(73) Assignee: BHA Group Holdings, Inc., Kansas City, MO (US)

(*) Notice: Subject to any disclaimer, the term of this patent is extended or adjusted under 35 U.S.C. 154(b) by 290 days.

(21) Appl. No.: 10/319,666

(22) Filed: Dec. 13, 2002

(65) Prior Publication Data

US 2003/0070976 A1 Apr. 17, 2003

Related U.S. Application Data

(63) Continuation-in-part of application No. 09/737,897, filed on Dec. 15, 2000, now Pat. No. 6,508,934.

(51) Int. Cl.[7] .................. B01D 29/21; B01D 29/33; B01D 27/06
(52) U.S. Cl. .............. 210/232; 210/411; 210/493.1; 210/493.5; 55/498; 55/521; 55/DIG. 5; 264/271.1; 264/279; 264/DIG. 48
(58) Field of Search ................. 210/232, 411, 210/493.1, 493.5; 55/498, 521, DIG. 5; 264/271.1, 279, DIG. 48

(56) References Cited

U.S. PATENT DOCUMENTS

| | | | |
|---|---|---|---|
| 3,178,025 A | 4/1965 | Brucken et al. | |
| 3,189,179 A | 6/1965 | McMichael | |
| 3,306,794 A | 2/1967 | Humbert, Jr. | |
| 3,397,793 A | 8/1968 | MacDonnell | |
| 3,520,417 A | * | 7/1970 | Durr et al. |
| 3,692,184 A | 9/1972 | Miller, Jr. et al. | |
| 3,752,321 A | 8/1973 | McLaren | |
| 4,402,830 A | 9/1983 | Pall | |
| 4,514,875 A | 5/1985 | Comer | |
| 4,652,285 A | 3/1987 | Greene | |
| 4,925,601 A | 5/1990 | Vogt et al. | |
| 5,084,178 A | * | 1/1992 | Miller et al. |
| 5,211,846 A | * | 5/1993 | Kott et al. |
| 5,316,677 A | 5/1994 | Harms, II | |
| 5,730,766 A | 3/1998 | Clements | |
| 5,753,071 A | 5/1998 | Spencer | |

FOREIGN PATENT DOCUMENTS

GB    2214447 A    9/1989

OTHER PUBLICATIONS

Product Information Dupont Hytrel Polyester Elastomer Hytrel 8238.

* cited by examiner

*Primary Examiner*—Thomas M. Lithgow
(74) *Attorney, Agent, or Firm*—Blackwell Sanders Peper Martin LLP; Greg Strugalski; Kyle L. Elliott

(57) ABSTRACT

A filter cartridge (20) and method for making a filter cartridge (20) for removing particulates from a particulate laden fluid stream moving one direction through the filter cartridge. The filter cartridge (20) is periodically subject to cleaning fluid moving in an opposite direction to the fluid stream. The filter cartridge (20) comprises filtration media (24) formed into a tubular configuration and having a plurality of circumferentially spaced apart pleats (26). A retention device (82) to limit radial movement of the filtration media (24) when subjected to the periodical cleaning fluid and to maintain the pleats (26) in the filtration media circumferentially spaced apart when exposed up to 130 degrees Celsius. Preferably, the extrudate (144) is thermoplastic, polyester, elastomeric material and at least one additive may be present. Multiple layers of the extrudate (144) may be fused together.

22 Claims, 3 Drawing Sheets

FILTER CARTRIDGE WITH STRAP AND METHOD

This is a continuation-in-part of application Ser. No. 09/737,897, filed Dec. 15, 2000, now U.S. Pat. No. 6,508,934.

BACKGROUND OF INVENTION

The present invention relates generally to a filter cartridge. In particular, the present invention relates to a retention strap for the filter cartridge and method of manufacturing the filter cartridge with the retention strap.

Filter cartridges that have pleated filtration media for filtering particulates from a particulate laden fluid stream moving in one direction through the filter cartridge are known. Such a filter cartridge is often subjected to cleaning fluid pulses moving for short periods of time through the filtration media in a direction opposite to the direction that the particulate laden fluid stream moves. Such a filter cartridge is typically referred to as a pleated filter cartridge utilized in lieu of bags found in baghouses. Known retention straps encircle portions of the pulse pleat filter cartridge to prevent the filtration media from excessive movement during exposure to the cleaning fluid pulses.

However, the known retention straps for pulse pleat filter cartridges have drawbacks because they are difficult to install onto a filter cartridge and may not remain in the relative axial location in which they are initially placed. For example, a known textile retention strap must be manually wrapped about the filtration media of the filter cartridge. The textile retention strap is typically tightened manually and the ends of the retention strap are overlapped. The ends of the retention strap are then adhered or fastened together while a desired tension is manually maintained on the retention strap.

It is important that the retention strap remain in a desired relative axial location along the filter cartridge to assure that the strap properly protect the filtration media from excessive movement during exposure to the cleaning fluid pulses. This is typically accomplished by the use of an adhesive. However, such an adhesive secured, axial location device has been known to fail and the strap may become incorrectly positioned axially along the filter cartridge

SUMMARY OF INVENTION

The present invention is directed to a filter cartridge for removing particulates from a particulate laden fluid stream moving one direction through the filter cartridge. The filter cartridge is periodically subjected to cleaning fluid moving in an opposite direction to the direction the particulate laden fluid stream moves. The filter cartridge comprises filtration media having a plurality of pleats. The filtration media is formed into a tubular configuration and has a plurality of circumferentially spaced apart pleats. Mounting structure is at a first axial end portion of the filtration media. An end cap is at a second axially opposite end portion of the filtration media. The filtration media is maintained in the generally tubular configuration by the mounting structure and the end cap. A retention device limits radial movement of the filtration media when subjected to the periodic cleaning fluid and maintains adjacent pleats in the filtration media circumferentially spaced apart.

The retention device comprises a thermoplastic elastomer material capable of withstanding the elevated operating temperatures and operating environment that the filter cartridge is exposed to. The retention device is attached to the filtration media. Each of the pleats of the filtration media has a tip and a pair of sides extending from the tip. The retention device engages and is adhered to at least one of the tips and sides of pleats of the filtration media. The retention device is applied to the filter cartridge during an extrusion operation. The retention device may include a reinforcement structure. Multiple layers of the extrudate may be utilized that are fused together.

The present invention is also directed to a method of making the filter cartridge. The method comprises the steps of providing filtration media formed into a tubular configuration and having a plurality of circumferentially spaced apart pleats. Mounting structure is provided at a first axial end portion of the filtration media and an end cap at a second axially opposite end portion of the filtration media to maintain the filtration media in the generally tubular configuration. A retention device is applied to limit radial movement of the filtration media in the opposite direction when subjected to the periodical cleaning fluid and to maintain the pleats in the filtration media circumferentially spaced apart.

The retention device applying step further includes the step of providing a polyester material, e.g., thermoplastic, polyester, elastomeric material, capable of withstanding the elevated operating temperatures and operating environment that the filter cartridge is exposed to. Each of the pleats of the filtration media has a tip and a pair of sides extending from the tip. The method also includes attaching the retention device to the filtration media. The retention device applying step further includes providing a retention device that engages at least one of the tips and sides of pleats of the filtration media. The retention device applying step further includes the step of extruding the retention device onto the filter cartridge. The extruding step further comprises the step of holding and rotating the filter cartridge while applying the retention device directly onto the filter cartridge. The retention device may be preferably applied between adjacent pleats. The retention device applying step may also include the step of providing reinforcing structure in the retention device. The providing reinforcing structure step further includes the step of extruding the retention device onto the filter cartridge. A step for applying multiple layers of the extrudate may be utilized where the multiple layers are fused together to form the retention device.

BRIEF DESCRIPTION OF DRAWINGS

Further features of the present invention will become apparent to those skilled in the art to which the present invention relates from reading the following description with reference to the accompanying drawings, in which.

DETAILED DESCRIPTION

The present invention is embodied in a filter cartridge 20 (FIGS. 1 and 2) for removing particulates from a particulate laden fluid stream moving one direction through the filter cartridge. The filter cartridge 20 is particularly suitable for use in air pollution control applications. The filter cartridge 20 is a pleated type of filter cartridge that is periodically subject to pulsed cleaning fluid moving in an opposite direction to the direction that the particulate laden fluid stream moves, as is known. Such a filter cartridge 20 may be subjected to over 300,000 cleaning pulses per year over a typical expected service life of about two years. The filter cartridge 20 is operably attached to a tube sheet 22 (FIG. 2) in a plenum (not shown) of a known baghouse (not shown).

Figure 1:
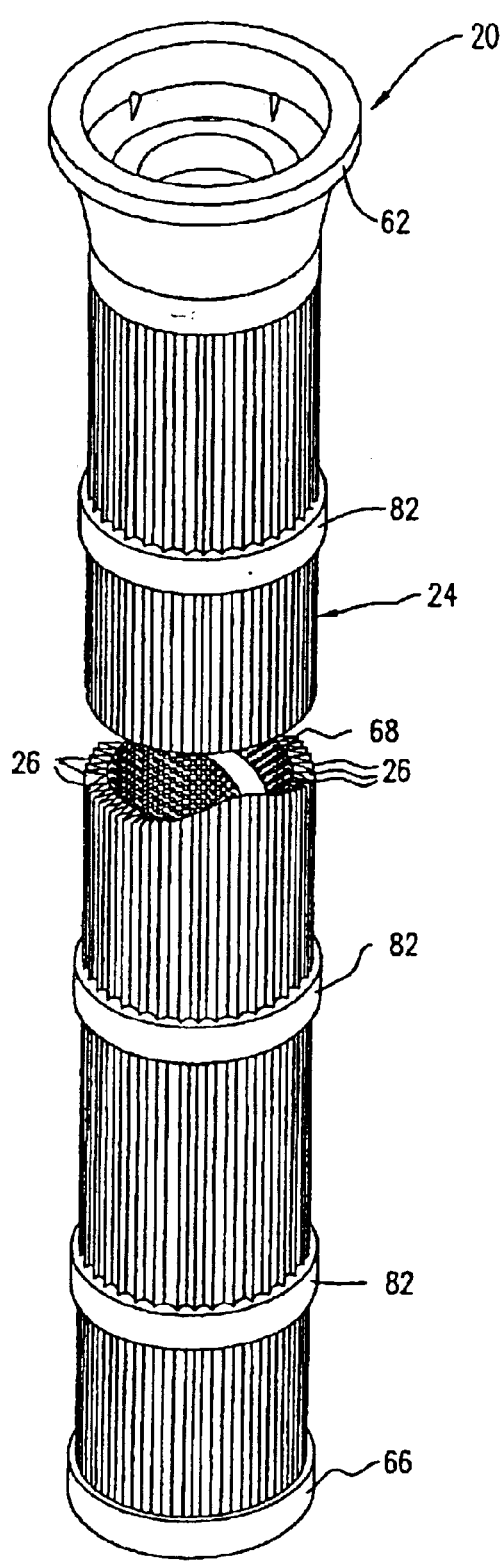
FIG. 1 is a perspective view of a filter cartridge incorporating a retention strap embodying the present invention.
Figure 2:
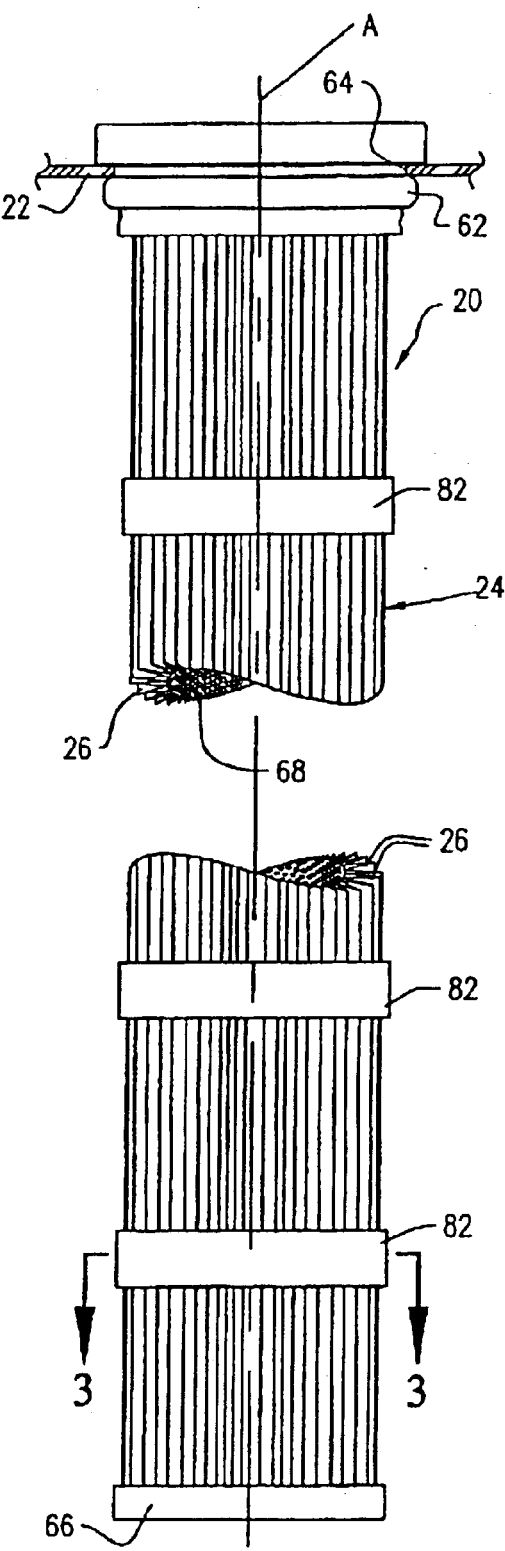
FIG. 2 is a side elevation view of the filter cartridge in FIG. 1.
Figure 3:
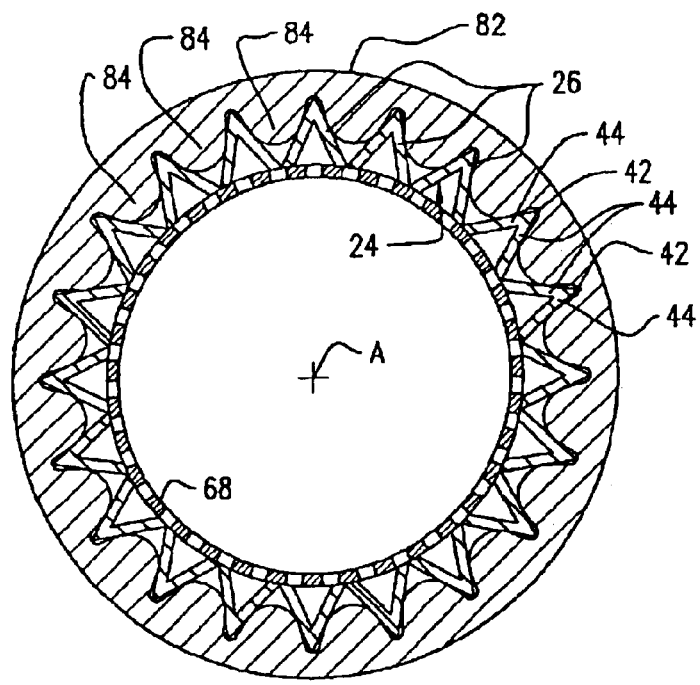
FIG. 3 is a cross-sectional view of the filter cartridge in FIG. 2, taken approximately along the line 3—3 in FIG. 2.
Figure 4:
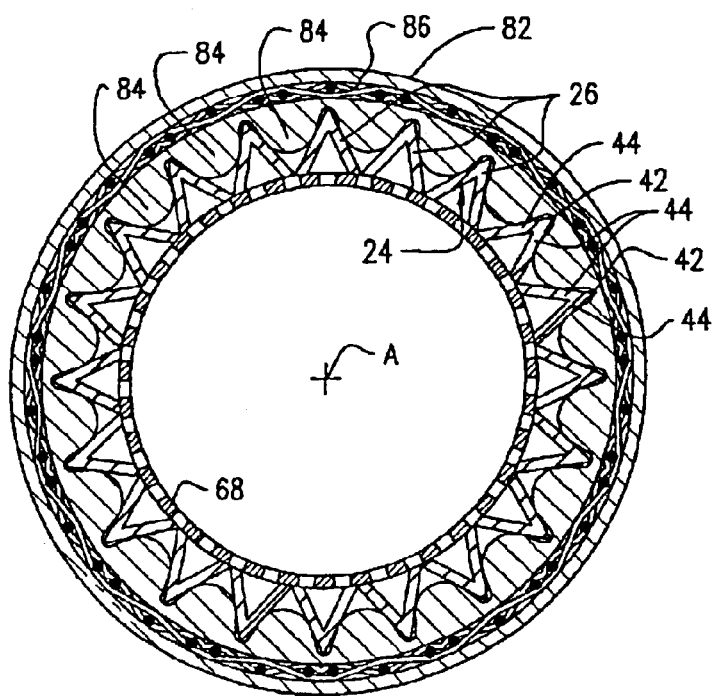
FIG. 4 is a view similar to FIG. 3 illustrating an alternate embodiment of the invention.

The filter cartridge 20 includes filtration media 24 that is formed into a generally tubular or cylindrical configuration, as illustrated in FIGS. 1, 3 and 4, with a longitudinal central axis A. The filtration media 24 has a plurality of pleats 26 which are circumferentially spaced about the circumference of the filter cartridge 20. Each pleat 26 has a tip 42 formed at its radially outermost location, as viewed in FIGS. 1, 3 and 4, and a pair of sides 44 extending radially inward from the tip. The pleats 26 in the filtration media 24 are not necessarily stiff and strong; thus, the pleats are prone to radially outward movement during a cleaning fluid pulse. It is believed that excessive radial outward movement of the filtration media 24 can damage the filtration effectiveness of the filter cartridge 20 and that adjacent pleats 26 may also "collapse" and temporarily engage one another during a cleaning pulse or during a filtration cycle. When adjacent pleats 26 engage one another, there is a chance that the cleaning pulse or filtration operation will not be as effective as it should be because gas flow through that portion of the filtration media 24 can be temporarily blocked. Thus, it is desirable to prevent excessive radial movement of the filtration media 24 and collapse of the pleats 26.

Mounting structure 62 (FIGS. 1–2) is located at a first axial end portion of the filtration media 24 and filter cartridge 20. The mounting structure 62 is made of an elastomeric material for mounting and sealing the filter cartridge 20 in an opening 64 (FIG. 2) in the tube sheet 22. A known suitable material for the mounting structure 62 is preferably made from a molded urethane material. An end cap 66 is located at an axially opposite second axial end portion of the filtration media 24 and filter cartridge 20. The end cap 66 is preferably made from a molded urethane material. The filtration media 24 is potted in potting compounds and maintained in the generally tubular configuration by the mounting structure 62 and the end cap 66. A permeable support 68 is located radially inward of the filtration media 24 to prevent inward collapse of the filtration media 24 during exposure to the particulate laden fluid stream that is to be filtered.

The filter cartridge 20 also includes a retention device in the form of a plurality of retention straps 82, constructed according the present invention. Numerous types of filter cartridges 20 may utilize retention straps 82 constructed in accordance with the present invention even though one specific type of filter cartridge 20, such as that disclosed in U.S. Pat. No. RE 37,163, reissued on May 8, 2001 to Oussoren et al., which is incorporated herein by reference, is illustrated herein as a nonlimiting example. Another illustrative, but nonlimiting, example of a filter cartridge 20 includes that disclosed in U.S. Pat. No. 5,746,792, issued on May 5, 1998 to Clements et al., which is also incorporated herein by reference.

The retention straps 82 limit radial movement of the filtration media 24 in the radially outward direction, opposite to the flow of the fluid stream to be filtered, when subjected to the periodical cleaning fluid. The retention straps 82 also serve to space apart and maintain adjacent pleats 42 spaced apart around the circumference of the filter cartridge 20. More importantly, the retention straps 82 prevent excessive outward movement of the pleats 26, which could result in the over-flexing of the filtration media 24 and the overstressing at the point of encapsulation of the pleated, filtration media 24 in the potting compounds. This excessive movement could result in a premature failure of the filter cartridge 20.

Each retention strap 82 embodying the present invention is preferably made from a thermoplastic, polyester, elastomeric material having sufficient strength and fatigue resistance to prevent excessive radial movement of the filtration media 24 during a cleaning pulse and maintain the pleats 26 spaced apart. The retention strap 82 is also capable of withstanding the elevated operating temperatures and operating environment, such as exposure to moisture and chemical degradation, that the filter cartridge 20 is typically exposed to and designed for.

The material of the retention strap 82 is selected for its strength and impact resistance at the relatively elevated operating temperatures that the retention strap 82 is exposed. The material of the retention strap 82 is also selected for its resistance to chemical and moisture degradation of its strength and impact resistance. The preferred polyester material meets these design parameters. Initial testing has shown that the strap can withstand over 150,000 cleaning pulses and function while constantly exposed to heat up to about 130 degrees Celsius, without losing its strength and without moving axially along the filter cartridge from the initial position.

The retention strap 82 engages and is adhered to at least some tips 42 and perhaps some of the sides 44 of pleats 26 of the filtration media 24, as illustrated in FIG. 3. The engagement minimizes radially outward movement of the tips 42 of the pleats 26 and that the pleats are maintained spaced apart without collapsing against one another during exposure to the pressure and flow of the cleaning fluid or the particulate laden air. The adherence assures that the retention strap 82 remains in the relative axial location it was originally placed in throughout its service life.

The retention strap 82 can be made from any suitable material. However, extruded polyester material is preferred with the optimal form of polyester material being thermoplastic, polyester, elastomers. A nonlimiting example of thermoplastic, polyester, elastomers includes HYTREL® available from E. I. Du Pont de Nemours & Company, having a place of business at 1007 Market Street, Wilmington, Del. 19898. HYTREL® utilizes polyetherester block copolymers consisting of hard (crystalline) segment of polybutylene terephthalate and soft (amorphous) segment based on long-chain polyether glycols. Also, HYTREL® combines the features found in elastomers and flexible plastics including toughness, resilience, high resistance to creep, impact and flex fatigue, flexibility at low temperatures and good property retention at elevated temperatures. Moreover, HYTREL® resists deterioration from many industrial chemicals, oils and solvents. Furthermore, HYTREL® is supplied as cylindrical to oval-shaped pellets that are extruded under heat and pressure. Two specific grades of HYTREL® that are particularly suitable include HYTREL® 5556 or HYTREL® 8238 thermoplastic polyester elastomers.

HYTREL® 8238, without additional additives, is a high modulus molding and extrusion grade, thermoplastic, polyester, elastomer that also contains color-stable antioxidants. The hardness measured by a durometer for HYTREL® 8238 is 82 Shore D, while the flexural modulus at −40° Celsius, 23° Celsius and 100° Celsius is 3,030 MPa., 1,210 MPa. and 255 MPa., respectively. Tensile strength at breaking, elongation at breaking, tensile strength at 5% strain, and tensile strength at 10% strain for HYTREL® 8238 is 48.3 MPa., 350%, 27.6 MPa. and 30.3 MPa., respectively. Toughness characteristics for the HYTREL® 8238 includes izod impact at −40° Celsius and 23° Celsius, resistance to flex cut growth and initial tear resistance with values of 30 J./m., 40 J./m., NA (cycles to 5×(times) cut growth) and 253 kN./m. respectively. Thermal characteristics for the HYTREL® 8238 includes a melt flow rate, a melting point, a vicat softening point, and a deflection temperature under flexural load at values of 0.5 MPa. and 1.8 MPa. with values of 12.5 g./10 minutes, 240° Celsius, 223° Celsius, 212° Celsius, 140° Celsius and 55° Celsius, respectively. Other characteristics for the HYTREL® 8238 include specific gravity, water absorption at a 1 kilogram load, taber abrasion with a CS-17 wheel and taber abrasion with a H-18 wheel with values of 1.28, 0.3%, 9 and 20, respectively.

HYTREL® 5556, without additional additives, is a medium modulus molding and extrusion grade, thermoplastic, polyester, elastomer that contains color-stable antioxidants. The hardness measured by a durometer for HYTREL® 5556 is 55 Shore D, while the flexural modulus at −40° Celsius, 23° Celsius and 100° Celsius is 760 MPa., 207 MPa. and 110 MPa., respectively. Tensile strength at breaking, elongation at breaking, tensile strength at 5% strain, and tensile strength at 10% strain for HYTREL® 5556 is 40 MPa., 500%, 6.9 MPa. and 10.3 MPa., respectively. Toughness characteristics for the HYTREL® 5556 includes an izod impact at −40° Celsius and 23° Celsius, resistance to flex cut growth and initial tear resistance with values of 170 J./m., No Break, $5 \times 10^5$ (cycles to 5×(times) cut growth) and 158 kN./m. respectively. Thermal characteristics for the HYTREL® 5556 includes a melt flow rate, a melting point, a vicat softening point, and a deflection temperature under flexural load at values of 0.5 MPa. and 1.8 MPa. with values of 7.5 g./10 minutes, 220° Celsius, 203° Celsius, 180° Celsius, 90° Celsius and 49° Celsius, respectively. Other characteristics for the HYTREL® 5556 include specific gravity, water absorption at a 1 kilogram load, taber abrasion with a CS-17 wheel and taber abrasion with a H-18 wheel with values of 1.20, 0.5%, 6 and 64, respectively.

Based on examination of above, illustrative, but nonlimiting, thermoplastic, polyester, elastomers among others, a number of parameters for the thermoplastic, polyester, elastomers for use with the present invention have been developed. The hardness measured by a durometer for the thermoplastic, polyester, elastomer is preferably in a range from about 40 Shore D to about 82 Shore D and more preferably in a range from about 50 Shore D to about 72 Shore D and optimally in a range from about 50 Shore D to about 65 Shore D.

The flexural modulus at −40° Celsius for the thermoplastic, polyester, elastomer is preferably in a range from about 155 MPa. to about 3,030 MPa. and more preferably in a range from about 500 MPa. to about 2,410 MPa. and optimally in a range from about 760 MPa. to about 1,800 MPa.

The flexural modulus at 23° Celsius for the thermoplastic, polyester, elastomer is preferably in a range from about 62 MPa. to about 1,210 MPa. and more preferably in a range from about 150 MPa. to about 570 MPa. and optimally in a range from about 207 MPa. to about 330 MPa.

The flexural modulus at 100° Celsius for the thermoplastic, polyester, elastomer is preferably in a range from about 27 MPa. to about 255 MPa. and more preferably in a range from about 75 MPa. to about 207 MPa. and optimally in a range from about 110 MPa. to about 150 MPa.

The tensile strength at breaking for the thermoplastic, polyester, elastomer is preferably in a range from about 28 MPa. to about 48.3 MPa. and more preferably in a range from about 35 MPa. to about 45.8 MPa. and optimally in a range from about 40 MPa. to about 41 MPa.

The elongation at breaking for the thermoplastic, polyester, elastomer is preferably in a range from about 350% to about 550% and more preferably in a range from about 360% to about 525% and optimally in a range from about 420% to about 500%.

The tensile strength at 5% strain for the thermoplastic, polyester, elastomer is preferably in a range from about 2.4 MPa. to about 27.6 MPa. and more preferably in a range from about 5.0 MPa. to about 14 MPa. and optimally in a range from about 6.9 MPa. to about 12 MPa.

The tensile strength at 10% strain for the thermoplastic, polyester, elastomer is preferably in a range from about 3.6 MPa. to about 30.3 MPa. and more preferably in a range from about 7.5 MPa. to about 20 MPa. and optimally in a range from about 10.3 MPa. to about 16 MPa.

The notched izod impact at −40° Celsius for the thermoplastic, polyester, elastomer is preferably in a range from about 25 J./m. to "No Break" and more preferably in a range from about 40 J./m. to "No Break" and optimally in a range from about 170 J./m. to "No Break".

The notched izod impact at 23° Celsius for the thermoplastic, polyester, elastomer is preferably in a range from about 35 J./m. to "No Break" and more preferably in a range from "No Break" to "No Break" and optimally in a range from "No Break" to "No Break".

The resistance to flex cut growth for the thermoplastic, polyester, elastomer is preferably in a range from about $3 \times 10^4$ cycles to 5×(times) cut growth to greater than $1 \times 10^6$ cycles to 5×(times) cut growth and more preferably in a range from about $4 \times 10^5$ cycles to 5×(times) cut growth to greater than $1 \times 10^6$ cycles to 5×(times) cut growth and optimally in a range from about $5 \times 10^5$ cycles to 5×(times) cut growth to greater than $1 \times 10^6$ cycles to 5×(times) cut growth.

The initial tear resistance for the thermoplastic, polyester, elastomer is preferably in a range from about 100 kN./m. to about 260 kN./m. and more preferably in a range from about 130 kN./m. to about 200 kN./m. and optimally in a range from about 150 kN./m. to about 180 kN./m.

The melt flow rate for the thermoplastic, polyester, elastomer is preferably in a range from about 4.0 g./10 minutes to about 15.0 g./10 minutes and more preferably in a range from about 7.0 g./10 minutes to about 11.0 g./10 minutes and optimally in a range from about 7.0 g./10 minutes to about 9.0 g./10 minutes.

The melting point for the thermoplastic, polyester, elastomer is preferably in a range from about 150° Celsius to about 225° Celsius and more preferably in a range from about 195° Celsius to about 218° Celsius and optimally in a range from about 203° Celsius to about 211° Celsius.

The vicat softening point for the thermoplastic, polyester, elastomer is preferably in a range from about 108° Celsius to about 220° Celsius and more preferably in a range from about 160° Celsius to about 205° Celsius and optimally in a range from about 180° Celsius to about 195° Celsius.

The deflection temperature under flexural load at values of 0.5 MPa. for the thermoplastic, polyester, elastomer is preferably in a range from about 50° Celsius to about 150° Celsius and more preferably in a range from about 70° Celsius to about 130° Celsius and optimally in a range from about 90° Celsius to about 115° Celsius.

The deflection temperature under flexural load at values of 1.8 MPa. for the thermoplastic, polyester, elastomer is preferably in a range from about 40° Celsius to about 60° Celsius and more preferably in a range from about 45° Celsius to about 52° Celsius and optimally in a range from about 49° Celsius to about 51° Celsius.

The specific gravity for the thermoplastic, polyester, elastomer is preferably in a range from about 1.10 to about 1.30 and more preferably in a range from about 1.15 to about 1.25 and optimally in a range from about 1.20 to about 1.22.

The water absorption at a 1 kilogram load for the thermoplastic, polyester, elastomer is preferably in a range from about 0.25% to about 0.75% and more preferably in a range from about 0.3% to about 0.6% and optimally in a range from about 0.3% to about 0.5%. The taber abrasion with a CS-17 wheel for the thermoplastic, polyester, elastomer is preferably in a range from about 3 mg./1,000 revolutions to about 15 mg./1,000 revolutions and more preferably in a range from about 6 mg./1,000 revolutions to about 13 mg./1,000 revolutions and optimally in a range from about 7 mg./1,000 revolutions to about 10 mg./1,000 revolutions.

The taber abrasion with a H-18 wheel for the thermoplastic, polyester, elastomer is preferably in a range from about 20 mg./1,000 revolutions to about 100 mg./1,000 revolutions and more preferably in a range from about 50 mg./1,000 revolutions to about 75 mg./1,000 revolutions and optimally in a range from about 60 mg./1,000 revolutions to about 70 mg./1,000 revolutions.

To obtain the most desired qualities, additional additives to the thermoplastic, polyester, elastomer are preferred. A preferred range for the percentage of pure thermoplastic, polyester, elastomer without additional additives is in a range from about 80 volume % to about 95 volume % and more preferably in a range from about 82 volume % to about 90 volume % and optimally in a range from about 85 volume % to about 86 volume %.

A first illustrative, but nonlimiting, example of an additive can include a hydrolytic stabilizer compound for improving serviceability in hot, moist environments. An illustrative, but nonlimiting example, includes HYTREL® 10MS available from E. I. Du Pont de Nemours & Company, having a place of business at 1007 Market Street, Wilmington, Del. 19898. A preferred percentage of hydrolytic stabilizer in the thermoplastic, polyester, elastomer compound is in a range from about 2.0 volume % to about 12.0 volume % and more preferably in a range from about 5.0 volume % to about 10 volume % and optimally in a range from about 9.0 volume % to about 9.5 volume %.

Another additive can also include a heat stabilizer for retarding thermal oxidative degradation and extend useful life at elevated temperatures. A second illustrative, but nonlimiting, example of this type of additive can include HYTREL® 30HS available from E. I. Du Pont de Nemours & Company, having a place of business at 1007 Market Street, Wilmington, Del. 19898. A preferred percentage of heat stabilizer in the thermoplastic, polyester, elastomer compound is in a range from about 2.0 volume % to about 6.0 volume % and more preferably in a range from about 3.0 volume % to about 5.0 volume % and optimally in a range from about 4.0 volume % to about 4.75 volume %. These two additives are merely preferred, illustrative examples of the numerous additives that may be utilized with the present invention.

As an illustrative, but nonlimiting example, for HYTREL® 5556 with the above two additives, the melt flow rate at 220 degrees Celsius is in a range from 5.0 grams per 10 minutes to about 10.0 grams per 10 minutes with a more preferred range of 6.0 grams per 10 minutes to about 9.0 grams per 10 minutes. The number average molecular weight is in a range from 30,000 to about 60,000 with a more preferred range of 35,000 to about 55,000. The weight average molecular weight is in a range from 60,000 to about 100,000 with a more preferred range of 65,000 to about 98,000. The intrinsic viscosity is in a range from 0.7 dL/g. to about 1.8 dL/g. with a more preferred range of 1.1 dL/g. to about 1.5 dL/g.

The retention strap 82 is preferably applied to the filter cartridge during an extrusion operation. The retention strap 82 is adhered to the filtration media 24 during the extrusion operation so it does not move along the filter cartridge in a direction parallel to the axis A. During the extrusion operation, the retention strap 82 has portions 84 (FIG. 3) which are forced to extend at least partially into the region between adjacent pleats 26. This assures that there is some structure located between the pleats 26 that prevent adjacent pleats from engaging each other. The retention strap 82 is also forced to engage and adhere to tips 42 and/or sides 44 of the pleats 26 to assure that the retention strap remains in the axial position it was originally applied to the filter cartridge 20. Once the material of the retention strap 82 "cures", it has a hardness and strength sufficient to withstand the operating environment it will be exposed to for its service life and adheres to the filtration media 24.

The retention strap 82 according to an alternate embodiment of the present invention further includes a reinforcement structure 86 (FIG. 4). The reinforcement structure 86 may be any suitable material but is contemplated to be textile reinforcement. The reinforcement structure 86 is introduced during the extrusion operation. The reinforcement structure 86 may be introduced during a single extrusion pass and forced into the extrudate or introduced between two separate extrusion passes.

Figure 5:
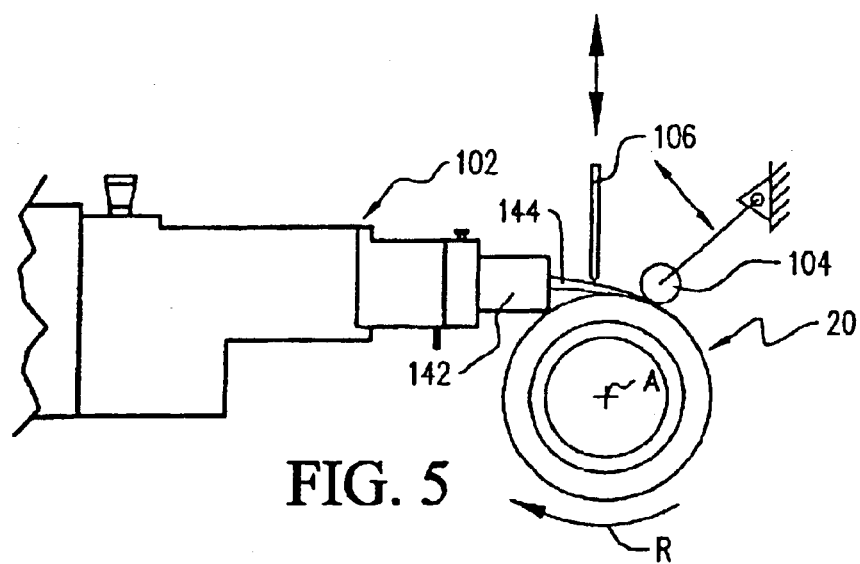
FIG. 5 is a side elevation schematic illustration of the extrusion equipment and one embodiment of the process used to apply the retention strap to the filter cartridge.
Figure 6:
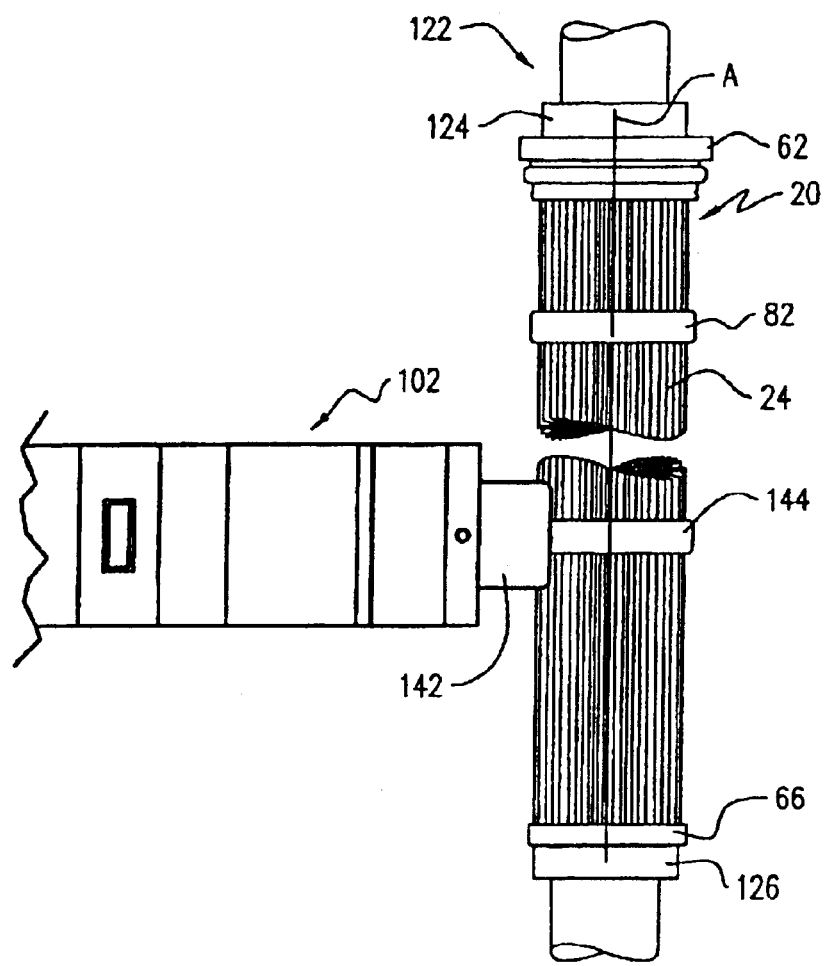
FIG. 6 is a schematic illustration of the extrusion equipment and process illustrated in FIG. 5, viewed from above.

The present invention is also directed to a method of making a filter cartridge 20 with the retention strap 82, as illustrated in FIGS. 5 and 6. The method includes an extruder 102, a pivotable application roller 104, a cutoff mechanism 106 and an optional reinforcement applicator (not shown). The method of the present invention is described below.

A filter cartridge 20, without any retention device, is held in proximity to the extruder 102 by a support mechanism 122. The support mechanism 122 is adapted to hold and rotate the filter cartridge 20 during the application of an extruded retention strap 82. The support mechanism 122 includes a mounting structure holder 124 and an end cap holder 126. The mounting structure holder 124 closely fits within and supports the mounting structure 62 of the filter cartridge 20. The end cap holder 126 supports the end cap 66 of the filter cartridge 20. The support mechanism 122 positions the filter cartridge 20 so the longitudinal central axis A of the filter cartridge extends in a direction normal to a barrel 142 of the extruder 102. Either or both of the holders 124 or 126 are operably connected with a drive mechanism (not shown) to rotate the supported filter cartridge 20 under the barrel 142 of the extruder 102, in a clockwise direction as illustrated by the arrow R in FIG. 5. Preferably, the extruder 102 heats the extrudate 144 in a range from about 215 degrees Celsius to about 288 degrees Celsius and more preferably in a range from about 232 degrees Celsius to about 265.5 degrees Celsius and optimally at 260 degrees Celsius. Preferably, the extruder 102 applies pressure to the extrudate 144 in a range from about 21 kilograms of force/square centimeter to about 84.4 kilograms of force/square centimeter and more preferably in a range from about 35.2 kilograms of force/square centimeter to about 70.3 kilograms of force/square centimeter and optimally at 63.28 kilograms of force/square centimeter The filter cartridge 20 is rotated under the barrel 142 of the extruder 102 while a band of extrudate 144 is applied to the outer surface the filter cartridge 20. The head of the barrel 142 includes a cooling feature that shapes and forms the extrudate 144 as it leaves the extruder 102. The application roller 104 is loaded to a predetermined force so the portions 84 of the uncured extrudate 144 is forced between adjacent pleats 26 of the filtration media 24. The application roller 104 also forces the extrudate 144 to contact tips 42 and sides 44 of pleats 26 to engage and adhere the retention strap 82 to the filtration media 24.

Preferably, but not necessarily, the filter cartridge 20 is rotated under the barrel 142 of the extruder 102 at least twice for two (2) rotations while a first layer of extrudate 144. is applied to the outer surface the filter cartridge 20 that is depressed within the plurality of pleats 26 followed by a second layer of extrudate 144 on top of the first layer of extrudate 144. The extrudate 144, preferably at least two (2) layers thereof, are fused together and then allowed to cure to form the retention strap 82. This performs the important function of keeping the pleats 46 from inverting.

In an alternate embodiment, reinforcement structure 84 may be introduced into the retention strap 82. Textile reinforcement 84 is paid off the optional reinforcement applicator. The textile reinforcement 84 is introduced into the extrudate 144. The application roller 104 forces the textile reinforcement 84 into the extrudate 144. Optionally, the textile reinforcement 84 could be placed between two separate layers of extrudate 144.

When circumferentially opposite ends of the extrudate 144 overlap, the cutoff mechanism 106 is activated to sever the extrudate 144. The application roller 104 then creates a unified one-piece retention strap 82 that remains in its axial relative place and supports the pleats 26 and prevents engagement between adjacent pleats 46.

From the above description of preferred embodiments of the invention, those skilled in the art will perceive improvements, changes and modifications. Such improvements, changes and modifications within the skill of the art are intended to be covered by the appended claims.

What is claimed is:

1. A filter cartridge for removing particulates from a fluid stream moving one direction through said filter cartridge, said filter cartridge periodically subject to cleaning fluid moving through said filter cartridge, said filter cartridge comprising: filtration media formed into a tubular configuration; a plurality of circumferentially spaced apart pleats in said filtration media; and a retention device, which includes thermoplastic, polyester, elastomeric material to limit radial movement of said filtration media in an opposite direction when subjected to said periodical cleaning fluid and to maintain said pleats in said filtration media circumferentially spaced apart, wherein said thermoplastic, polyester, elastomeric material is in a range from about 80 volume % to about 95 volume % of said retention device.

2. A filter cartridge for removing particulates from a fluid stream moving one direction through said filter cartridge, said filter cartridge periodically subject to cleaning fluid moving through said filter cartridge, said filter cartridge comprising: filtration media formed into a tubular configuration; a plurality of circumferentially spaced apart pleats in said filtration media; and a retention device, which includes thermoplastic, polyester, elastomeric material to limit radial movement of said filtration media in an opposite direction when subjected to said periodical cleaning fluid and to maintain said pleats in said filtration media circumferentially spaced apart, wherein said retention device includes a hydrolytic stabilizer with said thermoplastic, polyester, elastomeric material.

3. The filter cartridge of claim 2, wherein said hydrolytic stabilizer is in a range from about 2. volume % to about 12. volume % of said retention device.

4. A filter cartridge for removing particulates from a fluid stream moving one direction through said filter cartridge, said filter cartridge periodically subject to cleaning fluid moving through said filter cartridge, said filter cartridge comprising: filtration media formed into a tubular configuration; a plurality of circumferentially spaced apart pleats in said filtration media; and a retention device, which includes thermoplastic, polyester, elastomeric material to limit radial movement of said filtration media in an opposite direction when subjected to said periodical cleaning fluid and to maintain said pleats in said filtration media circumferentially spaced apart, wherein said retention device includes a heat stabilizer with said thermoplastic, polyester, elastomeric material.

5. The filter cartridge of claim 4, wherein said heat stabilizer is in a range from about 2. volume % to about 6. volume % of said retention device.

6. A filter cartridge for removing particulates from a fluid stream moving one direction through said filter cartridge, said filter cartridge periodically subject to cleaning fluid moving through said filter cartridge, said filter cartridge comprising: filtration media formed into a tubular configuration; a plurality of circumferentially spaced apart pleats in said filtration media; and a retention device, which includes thermoplastic, polyester, elastomeric material to limit radial movement of said filtration media in an opposite direction when subjected to said periodical cleaning fluid and to maintain said pleats in said filtration media circumferentially spaced apart, wherein said retention device has a measured hardness in a range from about 40 Shore D to about 82 Shore D, a measured flexural modulus at ±40° Celsius in a range from about 155 MPa. to about 3,030 MPa., a measured flexural modulus at 23° Celsius in a range from about 62 MPa. to about 1,210 MPa., and a measured flexural modulus at 100° Celsius in a range from about 27 MPa. to about 255 MPa.

7. A filter cartridge for removing particulates from a fluid stream moving one direction through said filter cartridge, said filter cartridge periodically subject to cleaning fluid moving through said filter cartridge, said filter cartridge comprising: filtration media formed into a tubular configuration; a plurality of circumferentially spaced apart pleats in said filtration media; and a retention device, which includes thermoplastic, polyester, elastomeric material to limit radial movement of said filtration media in an opposite direction when subjected to said periodical cleaning fluid and to maintain said pleats in said filtration media circumferentially spaced apart, wherein said retention device, has a measured hardness in a range from about 50 Shore D to about 72 Shore D, a measured flexural modulus at ±40° Celsius in a range from about 500 MPa. to about 2,410 MPa., a measured flexural modulus at 23° Celsius in a range from about 150 MPa. to about 570 MPa., and a measured flexural modulus at 100° Celsius in a range from about 75 MPa. to about 207 MPa.

8. A filter cartridge for removing particulates from a fluid stream moving one direction through said filter cartridge, said filter cartridge periodically subject to cleaning fluid moving through said filter cartridge, said filter cartridge comprising: filtration media formed into a tubular configuration; a plurality of circumferentially spaced apart pleats in said filtration media; and a retention device, which includes thermoplastic, polyester, elastomeric material to limit radial movement of said filtration media in an opposite direction when subjected to said periodical cleaning fluid and to maintain said pleats in said filtration media circumferentially spaced apart, wherein said retention device has a tensile strength at breaking in a range from about 28 MPa. to about 48.3 MPa., an elongation at breaking in a range from about 350% to about 550%, a tensile strength at 5% strain in a range from about 2.4 MPa. to about 27.6 MPa. and a tensile strength at 10% strain in a range from about 3.6 MPa. to about 30.3 MPa.

9. A filter cartridge for removing particulates from a fluid stream moving one direction through said filter cartridge, said filter cartridge periodically subject to cleaning fluid moving through said filter cartridge, said filter cartridge comprising: filtration media formed into a tubular configuration; a plurality of circumferentially spaced apart pleats in said filtration media; and a retention device, which includes thermoplastic, polyester, elastomeric material to limit radial movement of said filtration media in an opposite direction when subjected to said periodical cleaning fluid and to maintain said pleats in said filtration media circumferentially spaced apart, wherein said retention device has a tensile strength at breaking in a range from about 35 MPa. to about 45.8 MPa., has an elongation at breaking in a range from about 360% to about 525%, a tensile strength at 5% strain in a range from about 5. MPa. to about 14. MPa. and has a tensile strength at 10% strain in a range from about 7.5 MPa. to about 20.

10. A filter cartridge for removing particulates from a fluid stream moving one direction through said filter cartridge, said filter cartridge periodically subject to cleaning fluid moving through said filter cartridge, said filter cartridge comprising: filtration media formed into a tubular configuration; a plurality of circumferentially spaced apart pleats in said filtration media; and a retention device, which includes thermoplastic, polyester, elastomeric material to limit radial movement of said filtration media in an opposite direction when subjected to said periodical cleaning fluid and to maintain said pleats in said filtration media circumferentially spaced apart, wherein said retention device has a resistance to flex cut growth in a range from about $3 \times 10^4$ cycles to $5 \times$ (times) cut growth to greater than $1 \times 10^6$ cycles to $5 \times$ (times) cut growth, an initial tear resistance in a range from about 100 kN. fin. to about 260 kN./m. and taber abrasion with a CS-17 wheel in a range from about 3 mg./1,000 revolutions to about 15 mg./1,000 revolutions and has taber abrasion with an H-18 wheel in a range from about 20 mg./1,000 revolutions to about 100 mg./1,000 revolutions.

11. A filter cartridge for removing particulates from a fluid stream moving one direction through said filter cartridge, said filter cartridge periodically subject to cleaning fluid moving through said filter cartridge, said filter cartridge comprising: filtration media formed into a tubular configuration; a plurality of circumferentially spaced apart pleats in said filtration media; and a retention device, which includes thermoplastic, polyester, elastomeric material to limit radial movement of said filtration media in an opposite direction when subjected to said periodical cleaning fluid and to maintain said pleats in said filtration media circumferentially spaced apart, wherein said retention devices has resistance to flex cut growth in a range from about $4 \times 10$ cycles to $5 \times$ (times) cut growth to greater than $1 \times 10^6$ cycles to $5 \times$ (times) cut growth, an initial tear resistance in a range from about 130 kN./m. to about 200 kN./m. and has taber abrasion with a CS-17 wheel in a range from about 6 mg./1,000 revolutions to about 13 mg./1,000 revolutions and has taber abrasion with an H-18 wheel in a range from about 50 mg./1,000 revolutions to about 75 mg./1,000 revolutions.

12. A filter cartridge for removing particulates from a fluid stream moving one direction through said filter cartridge, said filter cartridge periodically subject to cleaning fluid moving through said filter cartridge, said filter cartridge comprising: filtration media formed into a tubular configuration; a plurality of circumferentially spaced apart pleats in said filtration media; and a retention device, which includes thermoplastic, polyester, elastomeric material to limit radial movement of said filtration media in an opposite direction when subjected to said periodical cleaning fluid and to maintain said pleats in said filtration media circumferentially spaced apart, wherein said retention device has a melt flow rate in a range from about 4. g./10 minutes to about 15. g./10 minutes, a melting point in a range from about 150° Celsius to about 225° Celsius and a vicat softening point from about 108° Celsius to about 220° Celsius, a deflection temperature under flexural load values of 0.5 MPa. in a range from about 50° Celsius to about 150° Celsius and a deflection temperature under flexural load values of 1.8 MPa. in a range from about 40° Celsius to about 60° Celsius.

13. A filter cartridge for removing particulates from a fluid stream moving one direction through said filter cartridge, said filter cartridge periodically subject to cleaning fluid moving through said filter cartridge, said filter cartridge comprising: filtration media formed into a tubular configuration; a plurality of circumferentially spaced apart pleats in said filtration media; and a retention device, which includes thermoplastic, polyester, elastomeric material to limit radial movement of said filtration media in an opposite direction when subjected to said periodical cleaning fluid and to maintain said pleats in said filtration media circumferentially spaced apart, wherein said retention device has a melt flow rate in a range from about 7. g./10 minutes to about 11. g./10 minutes, a melting point in a range from about 195° Celsius to about 218° Celsius and a vicat softening point from about 160° Celsius to about 205° Celsius, a deflection temperature under flexural load values of 0.5 MPa. in a range from about 70° Celsius to about 130° Celsius and a deflection temperature under flexural load values of 1.8 MPa. in a range from about 45° Celsius to about 52° Celsius.

14. A filter cartridge for removing particulates from a fluid stream moving one direction through said filter cartridge, said filter cartridge periodically subject to cleaning fluid moving through said filter cartridge, said filter cartridge comprising: filtration media formed into a tubular configuration; a plurality of circumferentially spaced apart pleats in said filtration media; and a retention device, which includes thermoplastic, polyester, elastomeric material to limit radial movement of said filtration media in an opposite direction when subjected to said periodical cleaning fluid and to maintain said pleats in said filtration media circumferentially spaced apart, wherein said retention device has a specific gravity a range from about 1.1 to about 1.3 and absorbs water at a 1 kilogram load in a range from about 0.25% to about 0.75%.

15. A filter cartridge for removing particulates from a fluid stream moving one direction through said filter cartridge, said filter cartridge periodically subject to cleaning fluid moving through said filter cartridge, said filter cartridge comprising: filtration media formed into a tubular configuration; a plurality of circumferentially spaced apart pleats in said filtration media: and a retention device, which includes thermoplastic, polyester, elastomeric material to limit radial movement of said filtration media in an opposite direction when subjected to said periodical cleaning fluid and to maintain said pleats in said filtration media circumferentially spaced apart, wherein said retention device, has a specific gravity a range from about 1.15 to about 1.25 and absorbs water at a 1 kilogram load in a range from about 0.3% to about 0.6%.

16. A filter cartridge for removing particulates from a fluid stream moving one direction through said filter cartridge, said filter cartridge periodically subject to cleaning fluid moving in an opposite direction to said fluid stream, said filter cartridge comprising: filtration media formed into a tubular configuration; a plurality of circumferentially spaced apart pleats in said filtration media; and a retention device, which includes thermoplastic, polyester, elastomeric material, to limit radial movement of said filtration media in an opposite direction when subjected to said periodical cleaning fluid and to maintain said pleats in said filtration media circumferentially spaced apart, wherein said retention device, which includes from about 80 volume % to about 95 volume % of said thermoplastic, polyester, elastomeric material and includes at least one additive, wherein said retention device has a measured hardness in a range from about 40 Shore D to about 82 Shore D, a measured flexural modulus at ±40° Celsius in a range from about 155 MPa. to about 3,030 MPa., a measured flexural modulus at 23° Celsius in a range from about 62 MPa. to about 1,210 MPa., a measured flexural modulus at 100° Celsius in a range from about 27 MPa. to about 255 MPa., a tensile strength at breaking in a range from about 28 MPa. to about 48.3 MPa., an elongation at breaking in a range from about 350% to about 550%, a tensile strength at 5% strain in a range from about 2.4 MPa. to about 27.6 MPa., a tensile strength at 10% strain in a range from about 3.6 MPa. to about 30.3 MPa., a resistance to flex cut growth in a range from about $3\times10^4$ cycles to 5×(times) cut growth to greater than $1\times10^6$ cycles to 5×(times) cut growth, an initial tear resistance in a range from about 100 kN./m. to about 260 kN./m, has a melt flow rate in a range from about 4. g./10 minutes to about 15. g./10 minutes and a melting point in a range from about 150° Celsius to about 225° Celsius and a vicat softening point from about 108° Celsius to about 220° C., a deflection temperature under flexural load values of 0.5 MPa. in a range from about 50° Celsius to about 150° Celsius and has a deflection temperature under flexural load values of 1.8 MPa. in a range from about 40° Celsius to about 60° Celsius, a specific gravity a range from about 1.1 to about 1.3, absorbs water at a 1 kilogram load in a range from about 0.25% to about 0.75%, and has taber abrasion with a CS-17 wheel in a range from about 3 mg./1,000 revolutions to about 15 mg./1,000 revolutions and has taber abrasion with a H-18 wheel in a range from about 20 mg./1,000 revolutions to about 100 mg./1,000 revolutions.

17. A filter cartridge for removing particulates from a fluid stream moving one direction through said filter cartridge, said filter cartridge periodically subject to cleaning fluid moving through said filter cartridge, said filter cartridge comprising: filtration media formed into a tubular configuration; a plurality of circumferentially spaced apart pleats in said filtration media; and a retention device, which includes a plurality of layers of thermoplastic, polyester, elastomeric material fused together to limit radial movement of said filtration media in an opposite direction when subjected to said periodical cleaning fluid and to maintain said pleats in said filtration media circumferentially spaced apart.

18. A method of making a filter cartridge for removing particulates from a fluid stream moving one direction through said filter cartridge and that is periodically subject to cleaning fluid moving in an opposite direction through said filter cartridge, said method comprising: providing filtration media formed into a substantially tubular configuration and having a plurality of circumferentially spaced apart pleats formed therein; and extruding a retention device, which includes thermoplastic, polyester, elastomeric material to limit radial movement of said filtration media in an opposite direction when subjected to said periodical cleaning fluid and to maintain pleats in said filtration media circumferentially spaced apart, wherein extruding said retention device further includes applying pressure in a range from about 21 kilograms/square centimeter to about 84.4 kilograms per square centimeter and temperature in a range from about 215 degrees Celsius to about 288 degrees Celsius to said extruded thermoplastic, polyester, elastomeric material forming said retention device.

19. The method of claim 18, wherein said extruding a retention device further includes applying at least one additive combined with said thermoplastic, polyester, elastomeric material.

20. The method of claim 19, wherein said thermoplastic, polyester, elastomeric material is in a range from about 80 volume % to about 95 volume % of said retention device and said at least one additive includes a hydrolytic stabilizer that is in a range from about 2. volume % to about 12. volume % of said retention device and a heat stabilizer that is in a range from about 2. volume % to about 6. volume % of said retention device.

21. A method of making a filter cartridge for removing particulates from a fluid stream moving one direction through said filter cartridge and that is periodically subject to cleaning fluid moving in an opposite direction through said filter cartridge, said method comprising the steps of: providing filtration media formed into a substantially tubular configuration and having a plurality of circumferentially spaced apart pleats formed therein; and applying a retention device, which includes thermoplastic, polyester, elastomeric material to limit radial movement of said filtration media in the opposite direction when subjected to the periodical cleaning fluid and to maintain pleats in the filtration media circumferentially spaced apart, wherein said retention device includes from about 80 volume % to about 95 volume % of said thermoplastic, polyester, elastomeric material and includes at least one additive, wherein said retention device has a measured hardness in a range from about 40 Shore D to about 82 Shore D, a measured flexural modulus at −40° Celsius in a range from about 155 MPa. to about 3,030 MPa., a measured flexural modulus at 23° Celsius in a range from about 62 MPa. to about 1,210 MPa., a measured flexural modulus at 100° Celsius in a range from about 27 MPa. to about 255 MPa., a tensile strength at breaking in a range from about 28 MPa. to about 48.3 MPa., an elongation at breaking in a range from about 350% to about 550%, a tensile strength at 5% strain in a range from about 2.4 MPa. to about 27.6 MPa., a tensile strength at 10% strain in a range from about 3.6 MPa. to about 30.3 MPa., a resistance to flex cut growth in a range from about $3\times10^4$ cycles to 5×(times) cut growth to greater than $1\times10^6$ cycles to 5×(times) cut growth, an initial tear resistance in a range from about 100 kN./m. to about 260 kN./m, has a melt flow rate in a range from about 4. g./10 minutes to about 15. g./10 minutes and a melting point in a range from about 150° Celsius to about 225° Celsius and a vicat softening point from about 108° Celsius to about 220° C., a deflection temperature under flexural load values of 0.5 MPa. in a range from about 50° Celsius to about 150° Celsius and has a deflection temperature under flexural load values of 1.8 MPa. in a range from about 40° Celsius to about 60° Celsius, a specific gravity a range from about 1.1 to about 1.3, absorbs water at a 1 kilogram load in a range from about 0.25% to about 0.75%, and has taber abrasion with a CS-17 wheel in a range from about 3 mg./1,000 revolutions to about 15 mg./1,000 revolutions and has taber abrasion with a H-18 wheel in a range from about 20 mg./1,000 revolutions to about 100 mg./1,000 revolutions.

22. A method of making a filter cartridge for removing particulates from a fluid stream moving one direction through said filter cartridge and that is periodically subject to cleaning fluid moving in an opposite direction through said filter cartridge, said method comprising the steps of: providing filtration media formed into a substantially tubular configuration and having a plurality of circumferentially spaced apart pleats formed therein; and applying a retention device by extruding at least one first thermoplastic, polyester, elastomeric material layer, applying at least one second thermoplastic, polyester, elastomeric material layer to said at least one at least one first thermoplastic, polyester, elastomeric material layer to create a retention device to limit radial movement of said filtration media in an opposite direction when subjected to said periodical cleaning fluid and to maintain pleats in said filtration media circumferentially spaced apart.

* * * * *